United States Patent Office 3,158,555
Patented Nov. 24, 1964

3,158,555
EXTRACTIVE SEPARATION PROCESS
David Cornell, Stillwater, Okla., assignor to Monsanto Company, a corporation of Delaware
No Drawing. Filed June 26, 1961, Ser. No. 119,268
15 Claims. (Cl. 202—39.5)

The present invention relates generally to the separation, concentration, and/or purification of hydrocarbons having various degrees of unsaturation. It is an object of the invention to separate close-boiling hydrocarbons of the classes of paraffins, monoolefins, diolefins, naphthenes and aromatic hydrocarbons by the use of phosphorus amides having the following structural formula:

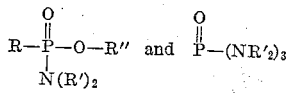

wherein R represents an alkyl radical, preferably having from 1 to 6 carbon atoms; R' represents an alkyl radical, preferably having from 1 to 4 carbon atoms, and R" is selected from the class consisting of alkyl and cycloalkyl radicals. It is also an object of the invention to carry out the said separations by means of an extractive distillation method employing the said phosphorus amides as the extracting agent.

In a number of hydrocarbon processing operations including cracking, reforming, aromatizing and dehydrogenating, a wide spectrum of hydrocarbons is formed having various degrees of unsaturation or of solubility parameter, cohesive energy density, or internal pressure. It is therefore desirable to be able to make a type separation in order to remove substantially all of each individual family group of hydrocarbons, i.e., the paraffins, monoolefins, diolefins, naphthenes and aromatic hydrocarbons. Further separations such as one olefin from another is also a desired objective. Conventional distillation methods are often poorly adapted to the separation and recovery of such classes of hydrocarbons in view of the small differences in the boiling points of the respective compounds. It has also been found that azeotropic distillation in which the azeotrope agents are added to reduce the boiling point of certain components is impractical because of the separation difficulties between such agents and the compounds with which the azeotrope has been formed.

It has now been found that the use of the above-described phosphorus amides makes its possible to conduct extractive separations among the above-described classes of hydrocarbons. In carrying out the present invention utilizing the said phosphorus amides in an extractive distillation process the phosphorus amide compound or a mixture thereof is introduced into a distillation column at a point near the top of the column. In this case the one hydrocarbon fraction is withdrawn as the overhead product, while the other hydrocarbon group is obtained as a bottom product dissolved in the phosphorus amides as the extractive distillation solvent.

The present method is applicable to the separation of hydrocarbons of the classes of paraffins, monoolefins, diolefins, naphthenes and aromatic hydrocarbons, as well as many individual members within such a class, for example, butene-2 from butene-1. The extractive distillation process using the phosphorus amides yields a vapor fraction containing the more volatile of the said hydrocarbons. The volatility here referred to is that of the hydrocarbon when in solution in the phosphorus amide, such volatility being the product $\gamma P_V$, where the $\gamma$ is the activity coefficient and $P_V$ is the vapor pressure of the hydrocarbon.

Relative volatility, $\alpha$, is, therefore the ratio of the $P_V$ products for two hydrocarbons.

It has been found that the present method is efficacious as an extractive process with a wide variety of crude hydrocarbon mixtures. Examples of such starting mixtures include the paraffin, monoolefin, and diolefin mixture obtained in the dehydrogenation of butane and butene in order to produce butadiene as the desired product. Another type of crude hydrocarbon mixture which is readily separated by the method of this invention is the octane-octene mixture resulting from the dehydrogenation of a $C_8$ fraction. Another type of hydrocarbon fraction which can be separated by the present process is a mixture of 5 carbon atom hydrocarbons obtained in a dehydrogenation of pentenes including isopentane in order to produce isoprene. The impurities in such a crude mixture include normal pentane, pentene-1, 2-methylbutene-1, and 2-methylbutene-2. Another crude hydrocarbon mixture readily separated by means of the present method is the mixture of naphthenes and aromatic hydrocarbons obtained in the aromatizing of normal hexane and the subsequent dehydrogenation of such crude mixture to produce benzene.

The proportion of the mixture of phosphorus amides employed in the present extractive separation method varies over the range of from 0.5 to 10 moles of the said phosphorus amide per mole of the crude hydrocarbon mixture, a preferred range being from 1 to 5 moles. The separation processes may be operated over a wide range of temperatures such as from 100° F. to 300° F., the upper temperature being limited by the tendency of the hydrocarbon to polymerize rather than by any inherent limitation of the extractive distillation process. The use of vacuum or pressure conditions in addition to atmospheric pressure is also a part of the present invention, such expedients being utilized in accordance with conventional practice in order to aid in the separation of low boiling components or in order to maintain high boiling components in the liquid without undue volatilization.

The apparatus employed in the extractive distillation process is typical of the equipment available in this field. It is obvious that such a distillation process may be conducted with any conventional distillation column of the bubble-plate, packed, or sieve-plate type as may be desired. The selection of the best reflux ratio, size and number of plates and other details of column design necessary in order to obtain the desired degree of purity will be obvious to one skilled in the art having the benefit of the present disclosure. If necessary to prevent or minimize the polymerization of unsaturated compounds, conventional polymerization inhibitors may also be used.

The apparatus employed constitutes a conventional extractive distillation column in which the crude mixture of hydrocarbons is charged to the middle region of a column with reflux being returned near the top of the column, while the overhead vapor fraction is withdrawn as an enriched stream of the material with the higher degree of saturation (or lower solubility parameter). The phosphorus amide solvent from any source is introduced into the column at a plate located several plates below the top of the column. The bottoms stream leaving the column contains the material with the lower degree of saturation or higher solubility parameter, together with the phosphorus amide solvent. Where more than one class of hydrocarbons is present in the vapor and/or liquid fractions, these fractions may be separately further treated with the extractive distillation solvent to effect further hydrocarbon separations or, where the boiling points or miscibilities of the various hydrocarbons are sufficiently different, other techniques such as fractional distillation or solvent extraction separation are suitable. In subsequent extractive distillations the more volatile hydrocarbon(s) is withdrawn as overhead vapors and the less volatile hydrocarbon(s) is withdrawn as liquid bottoms. The mixture of solute and solvent in the bottoms fraction is then separated into its components by conventional stripping or separation means, which may comprise the use of water washing, solvent extraction, distillation, or freezing, by which means one may obtain the bottoms solute in the desired pure state. For example, one may employ a conventional fractionation or stripper column, wherein by simple fractional distillation the solute from the bottoms product is recovered as the overhead fraction of the stripper in pure form. In another type of column the bottoms solute in admixture with the solvent is fed into the middle region of a column, while steam or another heated inert gas is fed to the bottom of the column. The overhead product from such stripping operation is the pure solute, while the solvent is obtained as the bottoms product which is then dried and recycled to the main distillation column, as described above.

It has been found that the instant phosphorus amides are particularly advantageous in the present process, since these materials are relatively stable against decomposition and are non-reactive with respect to the hydrocarbons as well as any impurities which are conventionally found in such crude mixtures. It is also an advantage that the phosphorus amides are generally relatively non-toxic and are relatively inexpensive materials. The use of phosphorus amides as herein disclosed makes it possible to separate close-boiling hydrocarbons in a considerably smaller column than would be required for conventional distillation.

The comparative selectivity of an extractive distillation solvent is best determined by its specific efficiency with respect to the hydrocarbon pair which are to be separated in the present method. This efficiency may be expressed as the relative volatility of the two hydrocarbons in the presence of the phosphorus amides solvent. The equation which expresses this relative volatility (alpha) is:

$$\alpha = \frac{(\gamma P_V) \text{ hydrocarbon } 1}{(\gamma P_V) \text{ hydrocarbon } 2}$$

where (gamma) represents the activity coefficients defined by the following equation:

$$\gamma_1 = \frac{Y_1 P_T}{X_1 P_{V_1}}$$

In the above equation $X_1$ and $Y_1$ represent the mole fractions of a given component in the liquid and vapor phase, respectively, while $P_V$ and $P_T$ represent the vapor pressure of the given component, and the total pressure of the system respectively.

In addition to selectivity, solubility of hydrocarbons in the phosphorus amides must be considered. The quantity of hydrocarbon dissolved in the solvent is governed by the temperature and pressure of the separation and by the character of the solvent and the hydrocarbon system.

The term, solubility parameter, is used in preference to the terms internal pressure or cohesive energy density. These terms are essentially equivalent. Cohesive energy density is the square of the solubility parameter, while internal pressure is $41.331 \times$ cohesive energy density.

The definition of the solubility parameter referred to in the previous paragraphs is as follows:

$$\delta = (\Delta E / V)^{1/2}$$

$E$ = internal energy of vaporization, calories/(g. mole)
$V$ = molal liquid volume, cc./(g. mole)

For the condition of ideal gases, $\Delta E$ may be calculated from handbook values of the latent heat of vaporization, $\Delta_v$. The temperatures are expressed as degrees, Kelvin.

$$\Delta E = \Delta H_v - RT$$

$\Delta H_v$ = latent heat of vaporization, calories/(g. mole)
$R$ = 1.987 calories/(g. mole) (° K.)
$T$ = absolute temperature, ° K.

It has been found by means of solubility measurements, standardized at 77° F., the naphthenes or aromatic hydrocarbons with a solubility parameter greater than about 8.4 are quite soluble in the above-described phosphorus amides. Paraffin or naphthene hydrocarbons with lesser solubility parameters are much less miscible. It has also been found that the solubility parameters given above are affected by the temperature of the system. Monoolefins and diolefins exhibit much greater miscibility with the phosphorus amide solvents than corresponding paraffin hydrocarbons. Accordingly, a separation can be effected through either a difference in degree or saturation or in the case of paraffin, naphthene and aromatic compounds, through a difference in solubility parameter. In some cases, e.g., a mixture of $C_4$ hydrocarbons, natural volatility ratios of some constituent pairs are inverted by the presence of the solvent.

The following examples illustrate specific embodiments of the invention:

EXAMPLE 1

A number of hydrocarbon type mixtures are employed in order to demonstrate the selectivity of cyclohexyl N,N-dimethyl-P-methylphosphonamidate as an extractive distillation solvent. These tests are conducted at a number of temperatures as set forth in the table below. At the said temperatures at which the equilibrium measurements are made, at the solvent ratio set forth in the table, the relative volatility of the two components is determined. These values of relative volatility are defined in accordance with the description above.

The table of data also shows the enhancement per plate obtained when using a 10% (mole) solution of the more volatile component of each pair with 90% of the less volatile in an extractive distillation using cyclohexyl N,N-dimethyl-P-methylphosphonamidate as the solvent.

"Enchancement per plate" is calculated according to the expression $$Y = \frac{\alpha X}{1 + (\alpha - 1) X}$$

the percentage enhancement being 100Y. In the expression, Y and X refer to vapor and liquid molar compositions, respectively, of the more volatile hydrocarbon, taken on a solvent-free basis. Thus $Y = 0.129$ as opposed to $X = 0.100$ indicates an enhancement of 12.9%.

*Table I*

| Run | Solute | Temp., ° F. | Solv. Ratio: Vol. Sol./ Vol. Solutes | Relative Volatility, $\alpha$ | Enhancement Per Plate percent |
|---|---|---|---|---|---|
| 1 | n-Pentane / Pentene-1 | 150 | 12.6 | 1.33 / 1.00 | 12.9 |
| 2 | n-Pentane / Pentene-1 | 150 | 16.9 | 1.37 / 1.00 | 13.2 |
| 3 | n-Pentane / 2-Methylbutene-1 / 2-Methylbutene-2 / Isoprene | 150 | 13.2 | 3.75 / 2.14 / 1.13 / 1.00 | 29.4 / 19.2 / 10.1 |
| 4 | n-Octane / Octene-1 | 116 | 15.6 | 1.15 / 1.00 | 11.3 |
| 5 | n-Hexane / Cyclohexane | 169 | 5.67 | 8.06 / 1.00 | 47.3 |
| 6 | Butane / Butene / Butadiene | 150 | 3 | 1.88 / 1.92 / 1.00 | 17.3 / 17.6 |
| 7 | Methylcyclopentane / n-Hexane / Benzene | 150 | 1 | 2.79 / 6.65 / 1.00 | 23.8 / 42.5 |
| 8 | 2,4-Dimethylpentane / Cyclohexane / Benzene | 150 | 0.5 | 3.95 / 1.30 / 1.00 | 30.5 / 12.6 |

EXAMPLE 2

This example illustrates the use of methyl N,N-dibutyl-P-hexylphosphonamidate as the extractive distillation solvent. The relative volatilities of the respective hydrocarbon mixtures are set forth in the table below. The table of data also shows the enhancement per plate obtained using a 10% (mole) solution of the more volatile component of each pair with 90% of the less volatile in an extractive distillation using methyl N,N-dibutyl-P-hexyl-phosphonamidate as the solvent.

Table II

| Run | Solute | Temp., °F. | Solv. Ratio: Vol. Sol./Vol. Solutes | Relative Volatility, α | Enhancement Per Plate percent |
|---|---|---|---|---|---|
| 1 | n-Pentane / Pentene-1 | 150 | 7.0 | 1.07 / 1.00 | 10.6 |
| 2 | n-Pentane / 2-Methylbutene-1 / Isoprene | 150 | 12.6 | 1.85 / 1.50 / 1.00 | 17.1 / 14.3 |
| 3 | n-Hexane / Cyclohexane | 190 | 2.82 | 2.08 / 1.00 | 18.8 |
| 4 | n-Hexane / Methylcyclopentane | 199 | 8.38 | 2.04 / 1.00 | 18.5 |
| 5 | Butane / Butene / Butadiene | 150 | 9 | 1.45 / 1.58 / 1.00 | 13.9 / 14.9 |
| 6 | Methylcyclopentane / n-Hexane / Benzene | 150 | 9 | 2.54 / 5.62 / 1.00 | 22.0 / 38.5 |
| 7 | 2,4-Dimethylpentane / Cyclohexane / Benzene | 150 | 5 | 2.20 / 1.45 / 1.00 | 19.7 / 13.9 |

EXAMPLE 3

The use of hexyl N,N-dimethyl-P-ethylphosphonamidate as the extractive distillation solvent in the separation of normal pentane from pentene-1 is shown in the following test data. The table of data also shows the enhancement per plate obtained using a 10% (mole) solution of the more volatile component of each pair with 90% of the less volatile in an extractive distillation using hexyl N,N-dimethyl-P-ethylphosphonamidate as the solvent.

Table III

| Solute | Temp., °F. | Solvent Ratio: Vol. Solvent/Vol. Solutes | Relative Volatility, α | Enhancement Per Plate (Percent) |
|---|---|---|---|---|
| n-Pentane / Pentene-1 | 150 | 27.4 | 1.10 / 1.00 | 10.9 |

A demonstration of the effectiveness of the phosphorus amide solvents described herein may be made by reference to data on the hydrocarbon selectivity of a 2/1 volume ratio acetone-water solvent as shown in the following table:

Table IV

| Hydrocarbon | Relative Volatility, α | |
|---|---|---|
| | Acetone-Water | Cyclohexyl N,N-Dimethyl P-methyl-phosphonamidate |
| n-Pentane | 1.43 | 3.75 |
| 2-Methylbutene-1 | 1.49 | 2.14 |
| Isoprene | 1.00 | 1.00 |

Selectivities and relative volatilities listed in the table are seen to be substantially less using the acetone-water solvent than the phosphorus amides of the instant invention.

The phosphorus amides used as solvents herein may readily be prepared by conventional means known in the art. For example, phosphorus amides are prepared by reacting amines or alcohols with phosphorus oxyhalides, halophosphates, haloamidophosphates and phosphonyl halides as more particularly detailed in Kosolapoff, "Organo-phosphorus Compounds," Wiley & Sons, Inc. (1950), chapter ten, sections II and X, and references cited therein.

The above data demonstrates that the hereinbefore-described phosphorus amides are highly effective as extractive distillation solvents in the separation of hydrocarbon mixtures.

What is claimed is:

1. The method of separating classes of hydrocarbons from a mixture comprising hydrocarbons of the classes consisting of paraffins, monoolefins, diolefins, naphthenes, and aromatic hydrocarbons which comprises contacting the said mixture with a phosphorus amide having the following structural formula:

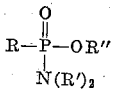

wherein R and R' represent alkyl radicals and R'' is selected from the group consisting of alkyl and cyclo-alkyl radicals in an extractive distillation separation, withdrawing a vapor fraction containing the more volatile of the said classes, and also withdrawing a liquid fraction containing the less volatile classes dissolved in the said phosphorus amide and thereafter separating the individual hydrocarbon classes from each of said fractions by conventional means and stripping the said phosphorus amide from the hydrocarbons dissolved therein.

2. The method of separating paraffins from olefins which comprises contacting a mixture thereof with a phosphorus amide having the following structural formula:

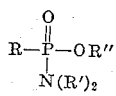

wherein R and R' represent alkyl radicals and R'' is selected from the group consisting of alkyl and cyclo-alkyl radicals in an extractive distillation separation, withdrawing a vapor fraction containing the more volatile paraffin and also withdrawing a liquid fraction containing the less volatile olefin dissolved in the said phosphorus amide and thereafter stripping the said phosphorus amide from the olefin dissolved therein.

3. The method according to claim 2 wherein the paraffin is pentane and the olefin is pentene.

4. The method according to claim 2 wherein the phosphorus amide is cyclohexyl N,N-dimethyl-P-methylphosphonamidate.

5. The method according to claim 2 wherein the phosphorus amide is methyl N,N-dibutyl-P-hexylphosphonamidate.

6. The method according to claim 2 wherein the phosphorus amide is hexyl N,N-dimethyl-P-ethylphosphonamidate.

7. The method according to claim 2 wherein the paraffin is octane and the olefin is octene.

8. The method of separating diolefins from a mixture comprising hydrocarbons of the classes consisting of paraffins, monoolefins, diolefins, naphthenes and aromatic hydrocarbons which comprises contacting the said mixture with a phosphorus amide solvent having the following structural formula:

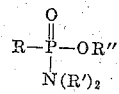

wherein R and R' represent alkyl radicals and R'' is selected from the group consisting of alkyl and cyclo-alkyl radicals in an extractive distillation separation, withdrawing a vapor fraction containing the more volatile paraffins, monoolefins, diolefins and naphthenes and also withdrawing a liquid fraction containing the less volatile aromatic hydrocarbons dissolved in the said phosphorus amide solvent and thereafter contacting the hydrocarbon mixture comprising said vapor fraction with additional amounts of said phosphorus amide solvent in a second extractive distillation to remove the more volatile paraffins, naphthenes and monoolefins as a vapor fraction from the less volatile diolefins dissolved in said solvent as a liquid fraction and thereafter stripping the said phosphorus amide from the diolefins dissolved therein.

9. The method according to claim 8 wherein the diolefin is isoprene.

10. The method according to claim 8 wherein the diolefin is butadiene.

11. The method according to claim 8 wherein the phosphorus amide is cyclohexyl N,N-dimethyl-P-methylphosphonamidate.

12. The method of separating paraffins from a mixture comprising hydrocarbons of the classes consisting of paraffins, monoolefins, diolefins, naphthenes and aromatic hydrocarbons which comprises contacting the said mixture with a phosphorus amide having the following structural formula:

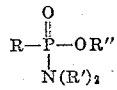

wherein R and R' represent alkyl radicals and R" is selected from the group consisting of alkyl and cycloalkyl radicals in an extractive distillation separation, withdrawing a vapor fraction containing the more volatile paraffins and also withdrawing a liquid fraction containing the less volatile olefins, naphthenes and aromatic hydrocarbons dissolved in the said phosphorus amide and thereafter stripping the said phosphorus amide from the hydrocarbons dissolved therein.

13. The method according to claim 12 wherein the paraffin is hexane and the phosphorus amide is cyclohexyl N,N-dimethyl-P-methylphosphonamidate.

14. The method of separating aromatic hydrocarbons from a mixture comprising hydrocarbons of the classes consisting of paraffins, monoolefins, diolefins, naphthenes and aromatic hydrocarbons which comprises contacting the said mixture with a phosphorus amide having the following structural formula:

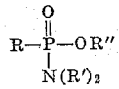

wherein R and R' represent alkyl radicals and R" is selected from the group consisting of alkyl and cycloalkyl radicals in an extractive distillation separation, withdrawing a vapor fraction containing the more volatile paraffins, olefins and naphthenes and also withdrawing a liquid fraction containing the less volatile aromatic hydrocarbons dissolved in the said phosphorus amide and thereafter stripping the said phosphorus amide from the aromatic hydrocarbons dissolved therein.

15. The method according to claim 14 wherein the aromatic hydrocarbon is benzene.

References Cited in the file of this patent

UNITED STATES PATENTS

| | | |
|---|---|---|
| 2,437,357 | McKinnis | Mar. 9, 1948 |
| 2,623,611 | Levine et al. | Dec. 30, 1952 |
| 2,730,558 | Gerhold | Jan. 10, 1956 |
| 2,758,956 | Shalit et al. | Aug. 14, 1956 |

OTHER REFERENCES

Technique of Organic Chemistry, vol. IV, Distillation (Weissberger), published by Interscience Publishers, Inc. (New York), 1951, pp. 338–339.

UNITED STATES PATENT OFFICE
CERTIFICATE OF CORRECTION

Patent No. 3,158,555                              November 24, 1964

David Cornell

It is hereby certified that error appears in the above numbered patent requiring correction and that the said Letters Patent should read as corrected below.

Column 1, lines 15 to 18, the formula should appear as shown below instead of as in the patent:

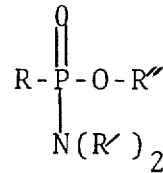

column 3, line 68, for "$\Delta_\nu$" read -- $\Delta H_\nu$ --; column 4, line 10, for "or" read -- of --; column 5, Table II, under the heading "Relative Volatility, α", line 1 thereof, for "107" read -- 1.07 --.

Signed and sealed this 24th day of August 1965.

(SEAL)
Attest:

ERNEST W. SWIDER                        EDWARD J. BRENNER
Attesting Officer                   Commissioner of Patents